US012774239B2

(12) United States Patent
Bioul et al.

(10) Patent No.: US 12,774,239 B2
(45) Date of Patent: Oct. 27, 2026

(54) SEGMENTED GLASS MELTING FURNACE

(71) Applicant: AGC GLASS EUROPE, Louvain-la-neuve (BE)

(72) Inventors: François Bioul, Thorembais-Saint-Trond (BE); Nicolas Bourgeois, Gosselies (BE); Zakaria Habibi, Braine-l'Alleud (BE); Fabrice Fasilow, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 228 days.

(21) Appl. No.: 18/294,842

(22) PCT Filed: Aug. 18, 2022

(86) PCT No.: PCT/EP2022/073108
§ 371 (c)(1),
(2) Date: Feb. 2, 2024

(87) PCT Pub. No.: WO2023/025661
PCT Pub. Date: Mar. 2, 2023

(65) Prior Publication Data

US 2024/0343627 A1 Oct. 17, 2024

(30) Foreign Application Priority Data

Aug. 26, 2021 (EP) ..................................... 21193304
Oct. 5, 2021 (EP) ..................................... 21200998

(51) Int. Cl.
*C03B 5/03* (2006.01)
*C03B 5/225* (2006.01)
*C03B 5/42* (2006.01)

(52) U.S. Cl.
CPC ................ *C03B 5/03* (2013.01); *C03B 5/225* (2013.01); *C03B 5/42* (2013.01)

(58) Field of Classification Search
None
See application file for complete search history.

(56) References Cited

U.S. PATENT DOCUMENTS 4,929,266 A 5/1990 Cozac et al.
5,078,777 A 1/1992 Cozac et al.
(Continued)

FOREIGN PATENT DOCUMENTS

CN 113292225 A 8/2021
DE 10 2009 009 942 B4 1/2012
(Continued)

OTHER PUBLICATIONS

FR-2787784-A1 EPO Machine Translation retrieved Dec. 17, 2025. (Year: 2025).*
(Continued)

*Primary Examiner* — Lisa L Herring
(74) *Attorney, Agent, or Firm* — Oblon, McClelland, Maier & Neustadt, L.L.P.

(57) ABSTRACT

A furnace for melting vitrifiable materials, including at least one first melting tank covered by a first melting crown and provided with electrical heating, a fining tank covered by a fining crown and provided with combustion heating, at least one first neck covered by a first crown and separating the at least one first melting tank and the fining tank, at least one first inlet located at the at least one first melting tank, for charging the at least one first melting tank with the vitrifiable materials to be heated, and at least one outlet located downstream of the fining tank for a melted glass to flow to a working zone.

23 Claims, 8 Drawing Sheets

(56) References Cited

U.S. PATENT DOCUMENTS

| | | | | |
|---|---|---|---|---|
| 5,766,296 A * | 6/1998 | Moreau | C03B 5/182 65/346 |
| 6,253,578 B1 * | 7/2001 | Kobayashi | C03B 5/2353 65/135.1 |
| 2016/0122221 A1 * | 5/2016 | Huber | C03B 5/44 65/346 |

FOREIGN PATENT DOCUMENTS

| | | | | |
|---|---|---|---|---|
| FR | 2787784 A1 * | 6/2000 | C03B 5/183 |
| WO | WO-2020229559 A1 * | 11/2020 | C03B 5/2353 |

OTHER PUBLICATIONS

International Search Report Issued Nov. 30, 2022, in PCT/EP2022/073108, filed on Aug. 18, 2022, 4 pages.

* cited by examiner

SEGMENTED GLASS MELTING FURNACE

CROSS REFERENCE TO RELATED APPLICATIONS

This application is a National Stage entry under 35 U.S.C. § 371 of PCT/EP2022/073108, filed on Aug. 18, 2022, and claims priority to EP patent application Ser. No. 21/193,304.9, filed on Aug. 26, 2021 and EP patent application Ser. No. 21/200,998.9, filed on Oct. 5, 2021, the entire contents of each are incorporated herein by reference.

FIELD OF THE INVENTION

The present invention relates to a glass melting furnace aimed at continuously supplying molten glass to glass forming installations such as float or rolling installations. In particular, the present invention relates to a glass melting furnace that provides a lot of advantages, especially in terms of energy consumption, $CO_2$ emissions and process flexibility.

The invention is more particularly related, but not limited, to melting furnaces for flat glass involving large production capacities, i.e. up to 1000 tons/day or more, and power demand up to 60 MW.

BACKGROUND OF THE INVENTION

In the state of the art, vitrifiable materials or glass raw materials are melted in a glass melting furnace that commonly comprises:

- a tank covered by a crown, containing a melt when the furnace is in use;
- at least one inlet located upstream of the furnace, for charging it with the glass raw materials to be heated;
- heating means located in the tank, and
- at least one downstream outlet for the melted glass to reach a processing zone or a working end.

In such glass meting furnace, the glass is commonly melted by flames coming from a combustion generated by burners provided above the glass surface and that allow to heat the bath of molten glass/raw materials from the top. Glass melting furnaces with oxy-fuel or air-fuel combustion are well known. Fuel may be, for example, fossil fuel, natural gas, biogas or hydrogen.

It is also known to combine, in a hybrid system, combustion heating means and electrical heating means. In such a configuration, the melting furnace comprises, in addition to burners, electrodes mandatorily immersed and commonly located at the bottom of the tank and that allow an electric current/power to pass through and heat the bath of molten glass from its bulk. It is to be noted that glass melting furnaces where the heating power is entirely supplied by electricity could be an option but they have not been adopted in the flat glass art when a high-quality glass is required. Indeed, first, the temperature required to refine a glass melt must be >1400° C. min, preferably higher than 1450° C., while the bottom temperature in the tank must be kept at a lower level (i.e. <1300° C.) to limit refractory corrosion, which is impossible to reach with only bottom electrodes, and secondly, production of high-quality flat glass requires an area where flow of glass melt is laminar and stratified and with free surface in order to let bubbles escape from the glass melt. In the art, these two conditions are commonly reached by heating this free surface of glass melt from the top in order to reach high enough temperature while generating stratified and laminar glass flow. Additionally, heat released at each electrode would generate a strong local glass convection that would completely disturb the required stratified laminar glass flow.

The global warming and the requirement for $CO_2$ emissions reduction increases the pressure on glass manufacturers, as well as the energy prices and $CO_2$ taxes that could become soon a severe threat on competitiveness in the glass business.

Electrical melting could be part of a solution, as it may help to decrease $CO_2$ emissions but also to decrease total energy consumption of the melting furnace (fuel+electricity). Though, conventional combustion glass melting furnaces can only be "boosted" with electrodes. Indeed, in such "electro-boosted combustion furnaces", the electrical input fraction is limited to maximum 10-15% of the total energy input.

Main limitations on classical electro-boosted combustion furnace designs when increasing electrical input fraction (i.e. above 15%) are:

(i) the significant increase of bottom refractory temperatures in the melting zone where the electrodes are located, thereby causing their accelerated corrosion; and (i) the significant decrease of the crown temperatures in the melting zone, leading to increased condensation of NaOH in said zone and consequently, to increased refractory corrosion of the crown.

These two combined corrosion phenomena (i)-(ii) would have a severe negative impact on the mechanical stability and the lifetime of the electrical super-boosted melting furnace, which is not at all desirable when investing in a glass melting furnace. Indeed, large glass melting furnaces, i.e. furnaces having production capacities of several hundreds of tons per day, are constructed to operate without interruption for periods of more than ten years and their lifetime is mainly determined by the corrosion of the refractory materials forming the walls thereof.

These limitations in the maximum electrical input fraction of conventional combustion glass melting furnace therefore prevent to fully benefit from the advantages of electrical melting (decrease of global energy consumption and $CO_2$ emissions).

Though, there is currently a need to have a glass melting furnace design that combines combustion burners and electrodes as heating means, which allows increasing significantly electrical input fraction (compared to classical electro-boosted combustion melting furnace) while maintaining or even improving its mechanical stability and lifetime.

OBJECTIVE OF THE INVENTION

It is an objective of the present invention to overcome the disadvantages described above with respect to the state of the art and resolving the technical problem, i.e. by providing a flat glass melting furnace combining combustion burners and electrodes as heating means, showing a decreased global energy consumption and decreased $CO_2$ emissions compared to a classical electro-boosted combustion melting furnace.

It is a further objective of the present invention to provide a glass melting furnace combining combustion burners and electrodes as heating means, without negatively impacting its lifetime or even, while improving it.

It is a further objective of the present invention to provide a glass melting furnace combining combustion burners and electrodes as heating means, with an increased flexibility.

DESCRIPTION OF THE INVENTION

The present invention relates to a furnace for melting vitrifiable materials, comprising (i) at least one melting tank T1*i* covered by a melting crown C1*i* and provided with electrical heating means;
(ii) a fining tank T2 covered by a fining crown C2 and provided with combustion heating means;
(iii) at least one neck Ni covered by a crown C3*i* and separating the at least one melting tank T1*i* and the fining tank T2;
(iv) at least one inlet mean Li located at the at least one melting tank, for charging it with vitrifiable materials to be heated; and
(v) at least one outlet mean Oi located downstream of the fining tank for the melted glass to flow to a working zone.

According to the invention, the furnace is defined by the following:

$$0.1 * W2 \leq W3i \leq 0.6 * W2;$$

$$W1i \geq 1.4 * W3i;$$

W1*i* being the width of tank T1*i;*
W2 being the width of tank T2;
W3*i* being the width of neck Ni.

Hence, the invention is based on a novel and inventive approach. In particular, the inventors have found that, by separating one or more electrically-heated melting zone(s) and a combustion fining zone by one or more neck(s) (same number as number melting zones) in a specific design, the global energy consumption as well as the $CO_2$ emissions of the furnace may be reduced significantly through a high electrical input fraction (i.e. >20% or even 30-50%) while not deteriorating or even improving the mechanical stability and lifetime of the furnace. By "electrical input fraction", it is meant the part of electricity in the total energy input of the furnace for the melting/fining, namely electricity/(fuel+electricity), the total energy input being that of the furnace in standard/normal production mode, i.e. at its standard pull range (excluding periods of start-up, maintenance, hot repair, culleting, . . . ).

The neck(s) width in the invention has been designed specifically by the inventors in order to find a good compromise between two opposite requirements: from one side, the neck(s) between the melting zone(s) and the fining zone should be ideally as narrow as possible in order to (1) decrease the opening between melting and fining superstructures/crowns and (2) generate an obstacle to global glass melt convection strength in the melting tank(s), and, from the other side, the neck should be ideally as wide as possible in order to limit glass velocity inside the neck(s), to limit neck refractory wall wear/corrosion.

The inventors have evidenced that the furnace of the invention brings a lot of advantages in favour of energy consumption/$CO_2$ emissions and/or in favour of mechanical stability/lifetime of the furnace. In particular, the furnace of the invention with its specific segmented design allows:

to cut off heat radiation from flames in the fining tank towards melting tank(s), in order to confine efficiently combustion energy in the zone where high temperatures are needed (fining zone);
to optionally separate atmospheres between the melting and the fining tanks, thereby limiting reflux of corrosive fumes from the fining tank to the melting tank(s);
to generate a restriction of the global molten glass flow that advantageously reduces the strength of glass convection in the melting tank and reduces the glass velocity, and thereby decreasing bottom refractory wear and corrosion;
to completely dissociate the dimensioning (lengths, widths and crown heights) and refractories nature of the melting and the fining tanks, and therefore to optimize each tank taking into account energy efficiency, glass quality and mechanical/structural/other constraints.

In present specification and claims, it is well understood by the person skilled in the art that, as used herein the terms "a", "an" or "the" means at least "one" and should not be limited to "only one" unless explicitly indicated to the contrary. Also, when a range is indicated, the extremities are included. In addition, all the integral and subdomain values in the numerical range are expressly included as if explicitly written. Finally, the terms "upstream" and "downstream" refer to the flow direction of the glass and are to be understood with their common sense, namely as meaning along the averaged moving direction of the vitrifiable materials/the glass melt (defined herein as "glass stream"), from the inlet mean(s) to the outlet mean(s), when operating the furnace according to the invention, that is to say along the direction going from the left to the right in FIG. 2 for example.

According to the invention and as commonly adopted in the glass art, by "melting tank", it is meant a tank defining a zone where the vitrifiable materials are charged and melt by heating, and comprising, when the furnace is in process, a melt and a "blanket" of unmelted vitrifiable materials that floats on the melt and is progressively melted and therefore reduced from upstream to downstream of the melting tank.

According to the invention and as commonly adopted in the glass art, by "fining tank", it is meant a tank defining a zone where there is no more "blanket" of unmelted vitrifiable materials that floats on the melt and where the glass melt is heated at temperatures higher than melting tank temperatures (generally above 1400° C. or even above 1450° C.), in order to refine the glass (mainly by eliminating major part of bubbles). This fining tank is also commonly called "clarification tank" in the art.

For the sake of clarity, according to the invention and as commonly accepted in the art, by a "neck" Ni, it is meant: (i) a narrowing in width and in (crown) height compared to the at least one melting tank T1*i* and the fining tank T2, and (ii) the opening of the neck Ni being only partially under the glass melt/batch blanket free surface, then leaving a free opening above the glass melt/batch blanket. This definition excludes therefore a "throat", which has its "opening" completely under the glass melt/blanket free surface (thereby leaving no free space above the glass melt/batch blanket), as commonly accepted in the art.

By "width" in the invention, it is meant, herein and in the whole specification and claims, unless otherwise specified, the dimension (in average) perpendicular to the glass stream.

Other features and advantages of the invention will be made clearer from reading the following description of preferred embodiments and figures, given by way of simple illustrative and non-restrictive examples.

Figure 1:
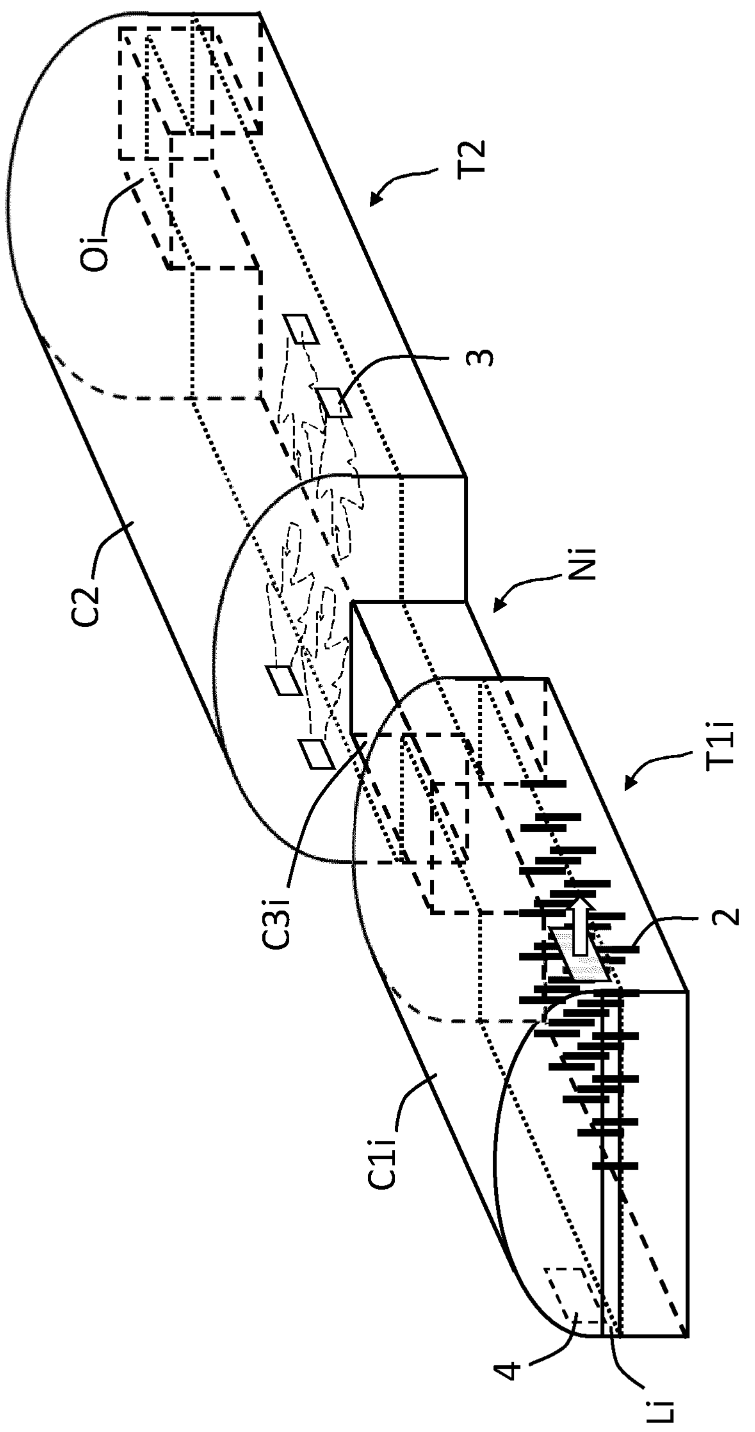
FIG. 1 is a schematic perspective view of an embodiment of a furnace according to the invention, in a "one melting tank" configuration.
Figure 2:
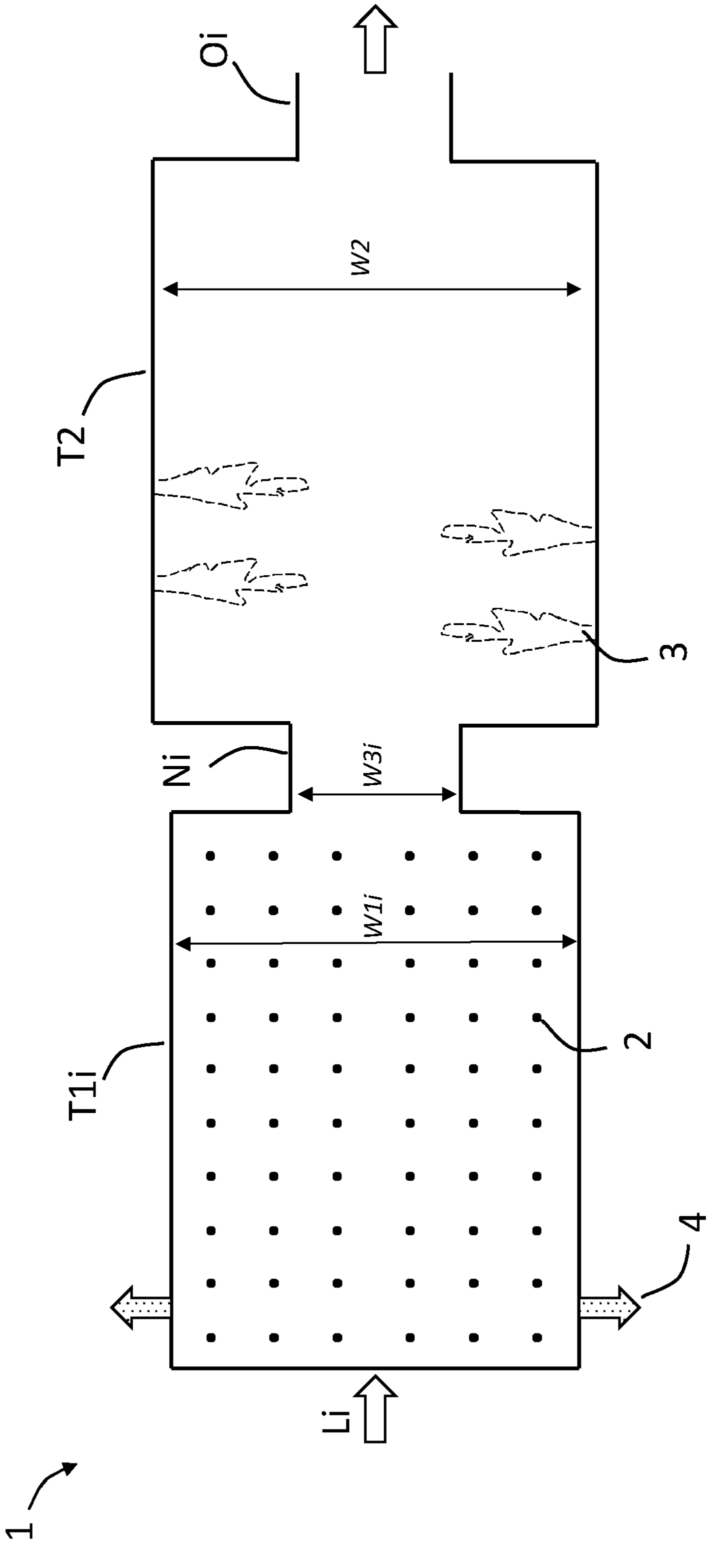
FIG. 2 is a schematic plan view (horizontal cross-section) of the furnace of FIG. 1.
Figure 3:
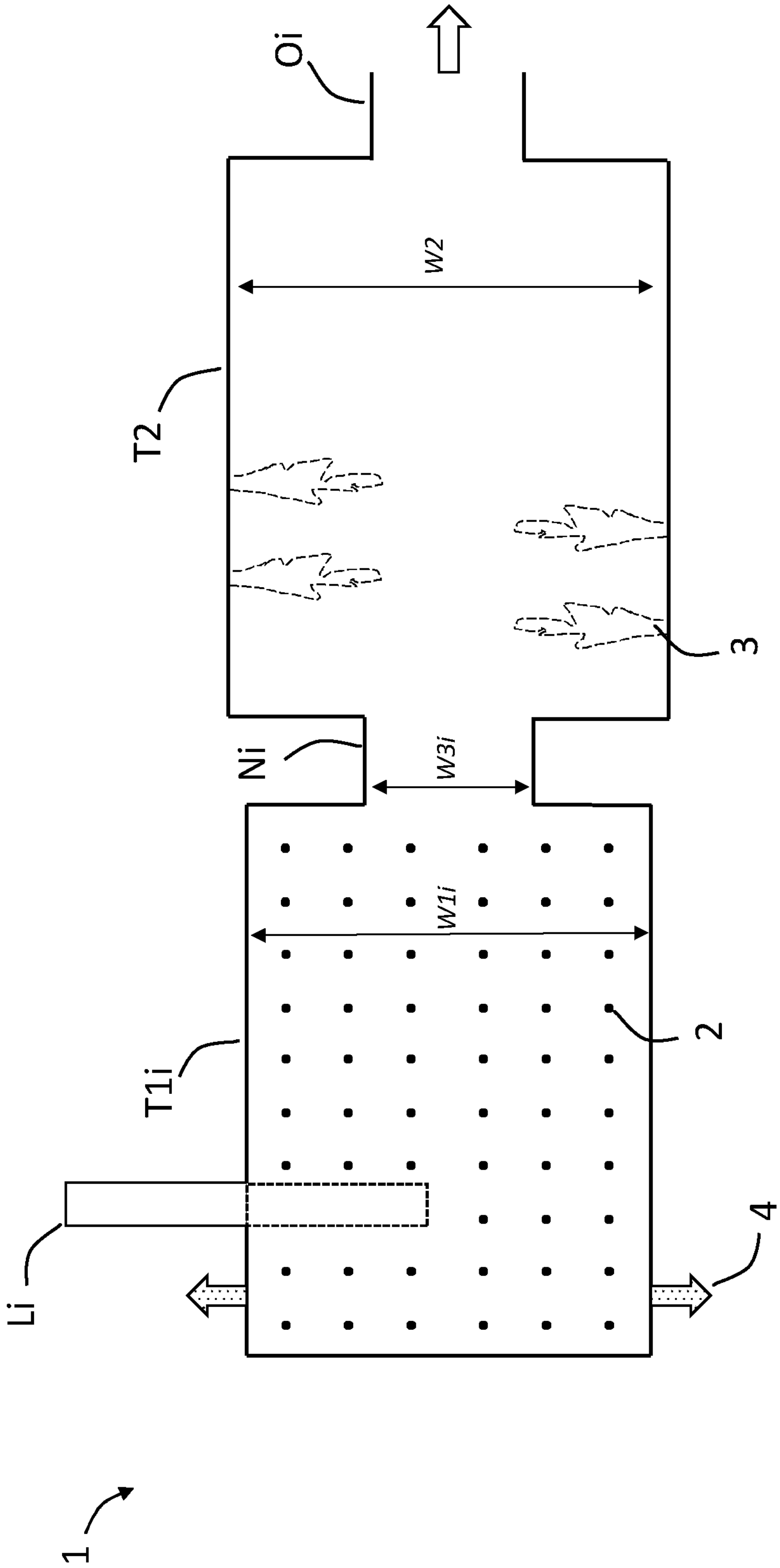
FIG. 3 is a schematic plan view (horizontal cross-section) of an embodiment of a furnace according to the invention.

The furnace 1 of FIGS. 1-3 ("one melting tank" configuration) comprises one melting tank T1*i*, one neck Ni and one fining tank T2. The assemblies of T1*i*, Ni and T2 is commonly made from refractory materials resistant to temperatures, corrosion of the fumes and aggressive action of the molten materials. The illustrative bath level in the tank is shown by a broken line.

According to the invention, the furnace 1 is supplied with vitrifiable materials at the melting tank T1*i*, thanks to at least one inlet mean Li. Preferably, and as known in the art, the at least one inlet mean Li is either located upstream of the melting tank T1*i* or located at the top of the melting tank T1*i*.

In an embodiment, the at least one inlet mean Li is located upstream of the melting tank T1*i*, either in the width of said tank (as illustrated in FIGS. 1-2) or laterally in its length. In this embodiment, to improve distribution over the surface of the tank T1*i*, several inlet means located upstream of the melting tank may be advantageously provided, i.e. two inlet means.

In an alternative embodiment, the at least one inlet mean Li is a located at the top of the melting tank. This inlet mean is known in the art as "top batch charger". This particular embodiment is advantageous as it allows to charge the raw materials directly on the top of glass melt, especially over the entire surface of the melting tank T1*i* thereby allowing to obtain a batch blanket covering the whole glass melt surface and consequently avoiding high temperature differences detrimental to crown C1*i* (like in a situation where the blanket coverage varies during melting process). It may advantageously be of the type "rotating batch charger" or "linear X-Y-batch charger", located above the glass melt and below the crown C1*i*. In FIG. 3, the inlet mean Li is located at the top of the melting tank T1*i* and is of the type "linear X-Y batch charger" in the form of a distributor arm that can move in both directions X-Y, namely in the length and width of the melting tank. The "top batch charger" according to this embodiment may also be of the type known as "rotating crown batch charger", i.e. as that proposed by Sorg®.

The furnace 1 includes a melting tank T1*i* provided with electrical heating means 2. Electrical heating means 2 according to the invention are preferably located at the bottom of the tank T1*i* and preferably, also, composed of immersed electrodes. The electrodes are advantageously arranged in grid pattern (checkerboard) multiple of 3 or 2, in order to facilitate connection to transformers and electric current balance. For example, the number of electrodes is designed in order to limit maximum power for each electrode to 200 kW, by respecting a maximum current density of 1.5 $A/cm^2$ at the electrode surface. For example also, immersed electrodes height is between 0.3 and 0.8 times glass melt height.

According to an embodiment, the melting tank T1*i* does not comprise any combustion means, e.g. any burner.

The crown C1*i* according to the invention may be commonly arched or vaulted, or alternatively, it may be flat. The crown C1*i* may be flat especially if the width W1*i* of the melting tank is lowered compared to common glass melting furnace and compared to width W2 of fining tank 2 (low span crown). When the crown C1*i* is arched/vaulted, it may be advantageously composed of refractories of the type alumina or spinel, which have a better resistance to corrosion and therefore a better lifetime (but lower creep resistance, that can be compensated by a lower crown span).

The crown C1*i* according to the invention has preferably a height H1*i* which is lower than the height H2 of the crown C2 of the fining tank T2 (H1*i*<H2). Indeed, a lower crown height H1*i* will lead to lower horizontal radiation heat transfer, and subsequently to better heat transfer from flue gases to the glass melt in case flue gases are extracted from the fining tank T2 towards the melting tank T1*i*. By "height" for a crown in the invention, it is meant the average inner height (i.e. in case of an arched/vaulted crown), from the inner surface of said crown to the glass melt (excluding batch blanket if present).

According to the invention, the furnace comprises a fining tank T2 covered by a fining crown C2 and provided with combustion heating means 3.

The fining crown C2 according to the invention is preferably arched or vaulted.

Combustion heating means 3 according to the invention are especially composed of burners located in the tank T2 and are usually arranged along the side walls of said tank on each side thereof to spread the flames over practically the entire width of the tank. The burners are spaced from one another in order to distribute the energy supply over a portion (i.e. ~50% of the length) of the fining tank T2. They are also commonly arranged in rows on either side of the tank.

The burners may be supplied with fuel and air, or fuel and oxygen, or fuel and a gas that is enriched in oxygen. Fuel may be fossil fuel, natural gas, biogas, hydrogen, ammonia, synthetic gas or mixture thereof.

According to the invention, the furnace comprises at least one neck Ni covered by a crown C3*i* and separating the at least one melting tank T1*i* and the fining tank T2. The base of the neck Ni may be located essentially at the level of the floor/bottom of the melting tank T1*i*. Moreover, the base of the neck Ni may be located essentially at the level of the floor/bottom of the fining tank T2 or above said level or below said level.

According to an embodiment, the neck Ni does not comprise any heating means, e.g. any electrical heating means and/or combustion means.

The crown C3*i* according to the invention may be arched or vaulted, or alternatively, it may be flat. The crown C3*i* of the neck Ni may preferably have a height H3*i* which is equal or lower than the height H2 of the crown C2 of the fining tank T2 (H3*i*≤H2). Preferably also, the neck Ni may have a height H3*i* which is equal or lower than the height H1*i* of the crown C1*i* of the melting tank T1*i* (H3*i*≤H1*i*). More preferably, H3*i*≤H2 and H3*i*≤H1*i*.

According to an advantageous embodiment, the furnace is defined by W1*i*≤W2. More preferably, the furnace of the invention is defined by W1*i*<W2 or better W1*i*<0.8*W2. This allows to reduce further the stress inside the melting crown $C1i$ by reducing its span. Indeed, it is known that the corrosion and temperature variations are the most critical in the melting zone. By reducing stress level inside the melting crown, it will then make possible the use of refractory materials that are more resistant to corrosion and less resistant to creep.

According to the invention, the furnace 1 is defined by $0.1*W2 \leq W3i \leq 0.6*W2$. Preferably, the furnace of the invention is defined by $0.2*W2 \leq W3i \leq 0.6*W2$. More preferably, the furnace of the invention is defined by $0.3*W2 \leq W3i \leq 0.5*W2$. This allow to reach a better compromise as exposed above at paragraph [0017].

According to the invention, the furnace 1 is defined by $W1i \geq 1.4*W3i$. Preferably, the furnace of the invention is defined by $W1i \geq 1.5*W3i$, or even $W1i \geq 1.8*W3i$. More preferably, the furnace of the invention is defined by $W1i \geq 2*W3i$. This allows to reach a higher width restriction at the neck Ni and to enhance the above-cited advantages of the furnace of the invention (to cut off heat radiation, to optionally separate atmospheres, to generate a restriction of the molten glass flow).

According to an advantageous embodiment of the invention, the furnace comprises further an extraction mean 4 of flue gas (generated in the fining tank T2) from upstream of the at least one melting tank T1*i*, preferably close to inlet mean(s) Li, in order to recover and transfer heat from flue gas to the glass melt and/or unmelted vitrifiable materials in the melting tank. Additionally or alternatively, the furnace may comprise an extraction mean of flue gas (generated in the fining tank T2) located downstream of the at least one melting tank T1*i*. Additionally or alternatively also, the furnace may comprise further an extraction mean of flue gas from upstream part of the fining tank T2.

According to still another advantageous embodiment of the invention, the furnace may comprise a removable wall located at the at least one neck Ni (e.g. a skimbar coming from the side wall of the neck), in order to (i) possibly stop unmelted vitrifiable materials that could arrive at the end of the melting tank and thereby avoid their passing through the neck towards the fining tank and (ii) control the intensity of or annihilate the backward flow of the glass melt from the fining towards the melting tank.

According to the invention, the furnace 1 comprises at least one outlet mean Oi located downstream of the fining tank T2 for the melted glass to reach a working zone. According to an embodiment, the outlet mean Oi is composed usually of a neck, in order to lead the melt towards a working zone commonly called "working end" or also "braise" or also "conditioning zone". Alternatively, the outlet mean Oi is composed of a throat, in order to lead the melt towards a working zone including, for example, fore heart(s). The working zone according to the invention may comprise, for example, a conditioning zone in which thermal conditioning by controlled cooling is carried out prior to glass melt leaving said zone through an outlet to a forming zone. Such a forming zone may comprise, for example, a float installation and/or a rolling installation.

Figure 4:
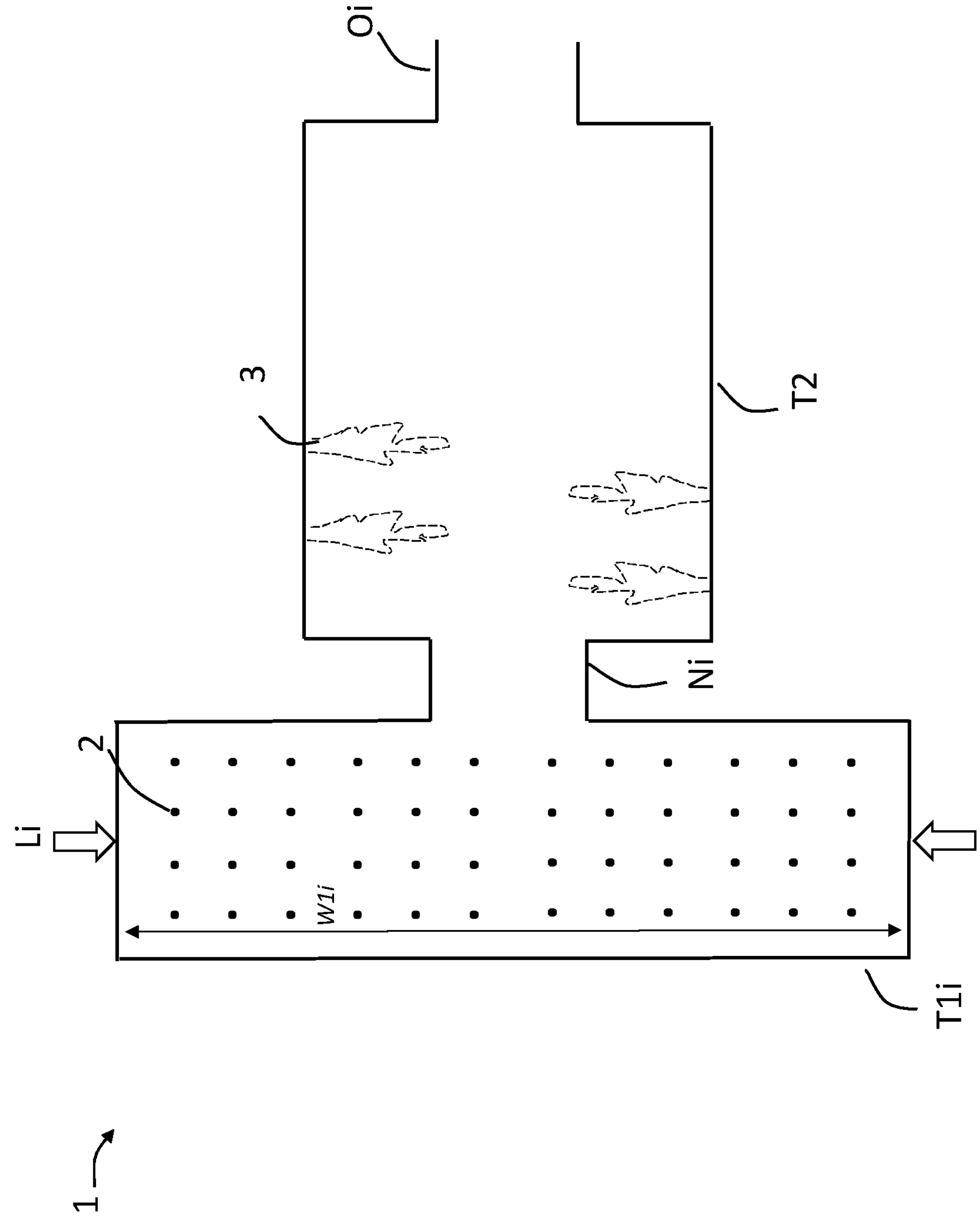
FIG. 4 is a schematic plan view (horizontal cross-section) of an embodiment of a furnace according to the invention.

In an embodiment of the invention, illustrated at FIG. 4, the furnace for melting vitrifiable materials comprises a melting tank T1*i* enlarged laterally and equipped with inlet mean(s) Li and Lii located at each lateral side, so that the melting tank comprises two upstream zones with two opposed glass streams (when the furnace is operating) converging through a central downstream zone. In such a configuration, the width W1*i* of the melting tank T1*i* is defined as the dimension (in average) taken perpendicularly to the glass stream in the neck Ni.

In a very preferred embodiment of the invention, the furnace for melting vitrifiable materials is in a configuration with two melting tanks T1*i*, T1*ii*; two necks Ni, Nii; and at least two inlet means Li, Lii. According to this advantageous embodiment, the furnace of the invention additionally comprises:

- a melting tank T1*ii* covered by a melting crown C1*ii* and provided with electrical heating means located at the bottom of said tank;
- a neck Nii covered by a crown C3*ii* and separating said melting tank T1*ii* and the fining tank T2;
- at least one inlet mean Lii located at the melting tank T1*ii*, for charging it with vitrifiable materials to be heated;

the furnace being further defined by the following:

$$0.1*W2 \leq W3ii \leq 0.6*W2;$$

$$W1ii \geq 1.4*W3ii;$$

W1*ii* being the width of tank T1*ii;*

W3*ii* being the width of neck Nii.

In this "two-melting tanks" configuration, the furnace for melting vitrifiable materials therefore comprises:

- (i) two melting tanks T1*i*, T1*ii*; each covered by a melting crown C1*i*, C1*ii*, respectively and provided with electrical heating means located at the bottom of said tanks;
- (ii) a fining tank T2 covered by a fining crown C2 and provided with combustion heating means;
- (iii) a neck Ni covered by a crown C3*i* and separating said melting tank T1*i* and the fining tank T2;
- (iv) a neck Nii covered by a crown C3*ii* and separating said melting tank T1*ii* and the fining tank T2;
- (v) at least one inlet mean Li located at the melting tank T1*i*, for charging it with vitrifiable materials to be heated;
- (vi) at least one inlet mean Lii located at the melting tank T1*ii*, for charging it with vitrifiable materials to be heated;
- (vii) at least one outlet Oi mean located downstream of fining tank for the melted glass to flow to a working zone;

the furnace being defined by the following:

$$0.1*W2 \leq W3i \leq 0.6*W2;$$

$$0.1*W2 \leq W3ii \leq 0.6*W2;$$

$$W1i \geq 1.4*W3i;$$

$$W1ii \geq 1.4*W3ii;$$

W1*i* being the width of tank T1*i;*

W1*ii* being the width of tank T1*ii;*

W2 being the width of tank T2;

W3*i* being the width of neck Ni;

W3*ii* being the width of neck Nii.

Figure 5:
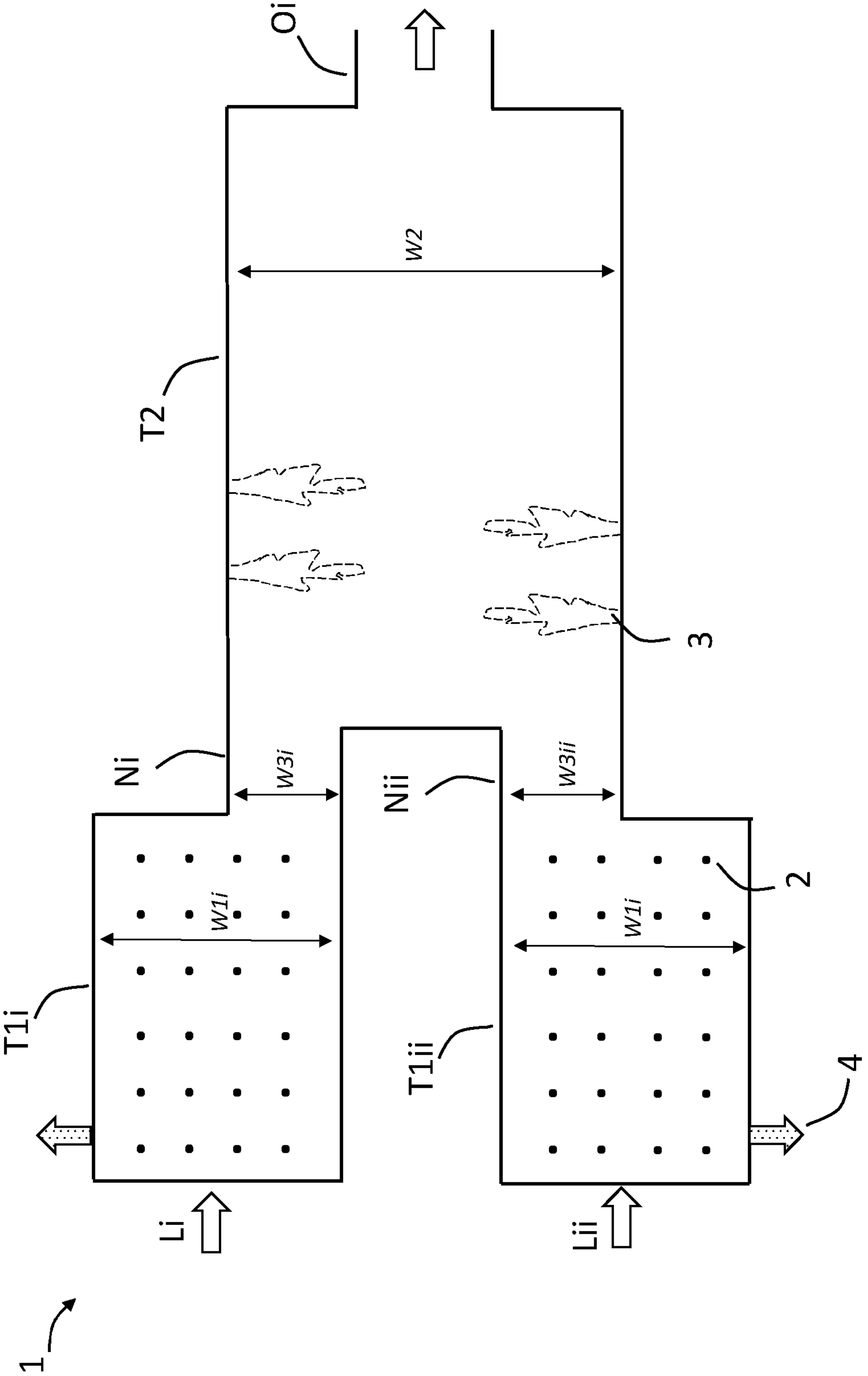
FIG. 5 is a schematic plan view (horizontal cross-section) of an embodiment of a furnace according to the invention, in a "two melting tanks" configuration.

This particular embodiment is illustrated in FIG. 5, with inlet means Li and Lii located upstream of the melting tank T1*i* and T1*ii*, respectively.

This embodiment is particularly advantageous compared to the configuration with one melting tank (FIGS. 1-3) as it allows:

to reduce the crown span of each melting tank for a same global melting tank area and furnace length (the length is generally more a constraint than the width). The reduction of crown span allows (i) to reduce stress inside the crown materials, and then reduce risk regarding material creep and crown sagging. It will then make possible the use of refractory materials that are more resistant to corrosion and less resistant to creep, such as alumina or spinel, and thereby increase furnace lifetime;

(ii) to reduce crown average height in case of arched shaped neck crown C3, leading to lower horizontal radiation transfer, and subsequently to better heat transfer from flue gas to the glass melt in case flue gas is extracted from melting tanks;

for a same total neck width (W3*i*+W3*ii*) and in case of arched shaped neck crown C3, to reduce the opening surface between the melting and fining tanks;

for a same total neck width (W3*i*+W3*ii*), to reduce the strength of glass convection in the melting tank;

to render easier furnace maintenance in the melting zone. Indeed, with 2 melting tanks, it is possible to isolate one melting tank from the rest of the furnace and cooling it down, while pursuing production with the other melting tank. It is then possible to increase the total furnace lifetime, by replacing worn refractory materials in the melting areas which is the most critical area regarding wear/corrosion.

In this advantageous embodiment where the furnace has two necks, two melting tanks and at least two inlet means ("two melting tanks" furnace, as illustrated in FIG. 5), each neck, each melting tank and each inlet mean may be designed independently of the other neck, melting tank and inlet mean respectively, according to the description above.

Specific advantageous features described in relation with the furnace with "one melting tank" configuration above, i.e. those linked to T1*i*, C1*i*, Li are applicable to the "two melting tanks" configuration, with the same advantages. Hence, for sake of clarity, features described above in relation with T1*i* are applicable to T1*ii*, features described above in relation with C1*i* are applicable to C1*ii*, and features described above in relation with Li are applicable to Lii.

In particular, the crown C3*ii* of the neck Nii may preferably have a height H3*ii* which is equal or lower than the height H2 of the crown C2 of the fining tank T2 (H3*ii*≤H2). Preferably also, the neck Nii may have a height H3*ii* which is equal or lower than the height H1*ii* of the crown C1*ii* of the melting tank T1*ii* (H3*ii*≤H1*ii*).

Preferably, the "two melting tanks" furnace is defined by 0.2*W2≤W3*ii*≤0.6*W2. More preferably, it is defined by 0.3*W2≤W3*ii*≤0.5*W2.

According to an advantageous embodiment, the "two melting tanks" furnace is defined by W1*ii*≤W2. More preferably, the furnace of the invention is defined by W1*ii*<W2 or better W1*ii*<0.8*W2. This allows to reduce further the stress inside the melting crown C1*i* by reducing its span. Indeed, it is known that the corrosion and temperature variations are the most critical in the melting zone.

Preferably also, the "two melting tanks" furnace is defined by W1*ii*≥1.5*W3*ii*, or even W1*ii*≥1.8*W3*ii*. More preferably, the "two melting tanks" furnace is defined by W1*ii*≥2*W3*i*.

In the "two melting tanks" furnace according to the invention, the two melting tanks T1*i*, T1*ii* are preferably connected to the fining tank by the necks Ni, Nii located in the width W2 of said fining tank (as illustrated in FIG. 5).

Alternatively, in the "two melting tanks" furnace of the invention, one melting tank is connected to the fining tank by a neck located in the width W2 of the fining tank and the other melting tank is connected to the fining tank by a neck located in the length of the fining tank (right or left side) and close to upstream of the fining tank (i.e. in the first third of its length). This last configuration may be advantageous, for example, when the space existing in the plant housing the furnace is not sufficient to place two melting tanks side by side.

In the "two melting tanks" furnace according to the invention, in the case where the two melting tanks T1*i*, T1*ii* are connected to the fining tank by the necks Ni, Nii located in the width W2 of said fining tank, the distance D between the two melting tanks T1*i* and T1*ii* is preferably at least 1 m, and more preferably, at least 2 m, or better at least 3 m. This is advantageous as it allows access to the zone for maintenance operations and tank wall overcoating.

In an alternative embodiment of the invention, the furnace for melting vitrifiable materials is in a configuration with three melting tanks T1*i*, T1*ii*, T1*iii*; three necks Ni, Nii, Niii and three inlet means Li, Lii, Liii. According to this advantageous embodiment, the furnace of the invention additionally comprises:

a melting tank T1*iii* covered by a melting crown C1*iii* provided with electrical heating means located at the bottom of said tanks;

a neck Niii covered by a crown C3*iii* and separating said melting tank T1*iii* and the fining tank T2;

at least one inlet mean Liii located at the melting tank T1*iii*, for charging it with vitrifiable materials to be heated;

the furnace being further defined by the following $$0.1 * W2 \leq W3iii \leq 0.6 * W2;$$

$$W1iii \geq 1.4 * W3iii;$$

W1*iii* being the width of tank T1*iii;*

W3*iii* being the width of neck Niii.

In this "three melting tanks" configuration, the furnace for melting vitrifiable materials therefore comprises:

(i) three melting tanks T1*i*, T1*ii*, T1*iii*; each covered by a melting crown C1*i*, C1*ii*, C1*iii* respectively and provided with electrical heating means located at the bottom of said tanks;

(ii) a fining tank T2 covered by a fining crown C2 and provided with combustion heating means;

(iii) a neck Ni covered by a crown C3*i* and separating said melting tank T1*i* and the fining tank T2;

(iv) a neck Nii covered by a crown C3*ii* and separating said melting tank T1*ii* and the fining tank T2;

(v) a neck Niii covered by a crown C3*iii* and separating said melting tank T1*iii* and the fining tank T2;

(vi) at least one inlet mean Li located at the melting tank T1*i*, for charging it with vitrifiable materials to be heated;

(vii) at least one inlet mean Lii located at the melting tank T1*ii*, for charging it with vitrifiable materials to be heated;

(viii) at least one inlet mean Liii located at the melting tank T1*iii*, for charging it with vitrifiable materials to be heated;

(ix) at least one outlet mean Oi located downstream of fining tank for the melted glass to flow to a working zone;

the furnace being defined by the following $$0.1*W2 \leq W3i \leq 0.6*W2;$$

$$0.1*W2 \leq W3ii \leq 0.6*W2;$$

$$0.1*W2 \leq W3iii \leq 0.6*W2;$$

$$W1i \geq 1.4*W3i;$$

$$W1ii \geq 1.4*W3ii;$$

$$W1iii \geq 1.4*W3iii;$$

W1*i* being the width of tank T1*i;*
W1*ii* being the width of tank T1*ii;*
W1*iii* being the width of tank T1*iii;*
W2 being the width of tank T2;
W3*i* being the width of neck Ni;
W3*ii* being the width of neck Nii;
W3*iii* being the width of neck Niii.

This embodiment is particularly advantageous compared to the configuration with one melting tank in the same way as for the "two melting tanks" configuration.

In this "three melting tanks", each neck, each melting tank and each inlet mean may be designed independently of the other necks, melting tanks and inlet means respectively, according to the description above.

Specific advantageous features described in relation with the furnace with "one melting tank" and with "two melting tanks" configurations above i.e. those linked to T1*i*, T1*ii*, C1*i*, C1*ii*, Li, Lii, are applicable to the "three melting tanks" configuration, with the same advantages. Hence, for sake of clarity, features described above in relation with T1*i*, T1*ii* are applicable to T1*iii*, features described above in relation with C1*i*, C1*ii* are applicable to C1*iii*, and features described above in relation with Li, Lii are applicable to Liii.

In particular, the crown C3*iii* of the neck Niii may preferably have a height H3*iii* which is equal or lower than the height H2 of the crown C2 of the fining tank T2 (H3*iii*≤H2). Preferably also, the neck Niii may have a height H3*iii* which is equal or lower than the height H1*iii* of the crown C1*iii* of the melting tank T1*iii* (H3*iii*≤H1*iii*).

Preferably, the "three melting tanks" furnace is defined by 0.2*W2≤W3*iii*≤0.6*W2. More preferably, it is defined by 0.3*W2≤W3*iii*≤0.5*W2.

Preferably, the "three melting tanks" furnace is defined by W1*iii*<W2. More preferably, it is defined by W1*iii*<0.8*W2. This allows to reduce further the stress inside the melting crown C1*i* by reducing its span. Indeed, it is known that the corrosion and temperature variations are the most critical in the melting zone.

Preferably also, the "three melting tanks" furnace is defined by W1*iii*≥1.5*W3*iii*, or even W1*iii*≥1.8*W3*iii*. More preferably, the "three melting tanks" furnace is defined by W1*iii*≥2*W3*ii*.

In the "three melting tanks" furnace according to the invention, the three melting tanks T1*i*, T1*ii*, T1*iii* may be connected to the fining tank by the necks Ni, Nii, Niii located in the width W2 of said fining tank. Alternatively, in the "three melting tanks" furnace of the invention, one melting tank may be connected to the fining tank by a neck located in the width W2 of the fining tank and the two other melting tanks may be connected to the fining tank by a neck located in the length of the fining tank and close to upstream of the fining tank (i.e. in the first third of its length), the first one being on the right side and the second one being on the left side of the fining tank. This last configuration may be advantageous, for example, when the space existing in the plant housing the furnace is not sufficient to place three melting tanks side by side and/or when the designed dimensions for the melting tanks and the necks (especially W1*i*, W1*ii*, W1*iii* and W3*i*, W3*ii*, W3*iii* and) cannot be realized in the width W2 of the fining tank.

In the "three melting tanks" furnace according to the invention, in the case where at least two melting tanks are connected to the fining tank by necks located in the width W2 of said fining tank, the distance D between the two melting tanks is preferably at least 1 m and more preferably, at least 2 m, or better at least 3 m. Independently, in the "three melting tanks" furnace according to the invention, in the case where the three melting tanks are connected to the fining tank by necks located in the width W2 of said fining tank, the distance D between the two melting tanks T1*i* and T1*ii* is preferably at least 1 m and more preferably, at least 2 m; and the distance D' between the two melting tanks T1*ii* and T1*iii* T1*ii* is also preferably at least 1 m and more preferably, at least 2 m.

In all furnace configurations according to the invention, namely "one melting tank", "two melting tanks" and "three melting tanks" configurations, to facilitate distribution of the vitrifiable materials to charge, more than one inlet mean may be provided for each melting tank, i.e. two inlet means by melting tank.

In all furnace configurations according to the invention, preferably, the total surface area of the melting tank(s) ranges from 25 to 400 $m^2$. Preferably also, according to the invention, the surface area of the fining tank ranges from 25 to 400 $m^2$.

The person skilled in the art realizes that the present invention is by no means limited to the preferred embodiments described above. On the contrary, many modifications and variations are possible within the scope of the appended claims. It is further noted that the invention relates to all possible combinations of features, and preferred features, described herein and recited in the claims.

The following examples are provided for illustrative purposes, and are not intended to limit the scope of this invention.

EXAMPLES

Examples of furnaces according to the invention and a comparative example of a conventional combustion furnace (optionally electro-boosted) were computed.

The optimization and design of melting furnaces is difficult, risky and very slow without mathematical modelling. Indeed, furnaces are very expensive and their lifetime is more than 15 years, even up to 20 years. There are then only few occasions to perform study and design modifications, and there is a high pressure to reduce the risk related to these modifications. Therefore, mathematic modelling of the melting process in operated glass furnaces has been developed thoroughly in the glass art and is well known amongst glass manufacturers. Use of mathematical models provides detailed temperature and velocity fields of the glass melt in the tank(s), and of the gases in the combustion/fining space(s). The results of these existing mathematical modelling have been validated on many operating furnaces, by comparison with measurements (thermocouples and infrared cameras).

The following furnaces with same glass pull were considered for the present computations:

Furnace 1 (comparative): conventional combustion glass melting furnace: one tank including melting and refining zones, equipped with burners fed with air-gas and with electrodes for optional electro-boosting.

Furnace 2: furnace according to the invention, in a "one melting tank" configuration, equipped with:

a melting tank T1*i* with a tank width W1*i*=13.0 m, and an average crown height H1*i*=1.35 m an inlet mean Li located upstream of the melting tank, electrodes in the melting tank reaching a total installed power equal to 16.0 MW a neck Ni with a width W3*i*=4.5 m=0.35 W1*i*, and an average crown height H3*i*=0.35 m a fining tank T2, with a tank width W2=13.0 m, and an average crown height H2=3.5 m oxy-burners fed with pure oxygen and natural gas in the fining tank, with a total installed power equal to 16.0 MW;

an outlet mean O an extraction mean to extract flue gas located in the upstream part of the melting tank, close to the inlet where vitrifiable materials are charged;

Furnace 3: furnace according to the invention, in a "two melting tanks" configuration. In this considered computation, both melting tanks have identical dimensions and are placed symmetrically (see FIG. 3). The distance between both melting tanks is equal to 4.8 m. Furnace 3 is equipped with:

a melting tank T1*i* with a tank width W1*i*=8.4 m, and an average crown height H1*i*=0.95 m a melting tank T1*ii* with W1*ii*=W1*i* and H1*ii*=H1*i* an inlet mean Li located upstream of the melting tank T1*i*, an inlet mean Lii located upstream of the melting tank T1*i*, electrodes in the melting tanks with an installed power equally shared between both tanks, a neck Ni with a width W3*i*=3.6 m, and an average crown height H3*i*=0.54 m, a neck Nii with a width W3*ii*=W3*i* and H3*ii*=H3*i*, a fining tank T2 with tank dimensions equal to those of the Furnace 2, burners fed with air-gas in the fining tank with identical features as those of the Furnace 2, an outlet mean O, an extraction mean to extract flue gas from melting tank.

Energy consumption (gas/electricity), bottom temperatures, crown temperatures and glass circulation were evaluated for these furnaces 1-3.

Energy Consumption

Table 1 shows computed values for gas consumption, electricity consumption and total energy consumption, as well as the electrical input fraction for furnaces 1-3.

For the conventional furnace 1, two situations were considered: the situation of full combustion (100% gas energy) and the situation with a maximum viable electro-boosting of this furnace (beyond this maximum, bottom and crown temperatures would lead to high refractory corrosion and serious furnace damage).

TABLE 1

| | Gas consumption (in MW) | Electricity consumption (in MW) | Total consumption (in MW) | Electrical input fraction |
|---|---|---|---|---|
| Furnace 1 (comparative) | 47 | 0 | 47 | 0 |
| Furnace 1 with viable maximum electro-boosting, 5 MW (comparative) | 37 | 5 | 43 | 12% |
| Furnace 2 | 15 | 15 | 30 | 50% |
| Furnace 3 | 15 | 16 | 31 | 52% |

Table 1 shows very well that, compared to a classical electro-boosted combustion melting furnace, furnaces according to the invention allow to decrease total energy consumption (by ~30%) while increasing the electrical input fraction (reaching values up to 50%) and thereby decreasing significantly $CO_2$ emissions.

Bottom Temperatures

Figure 6:
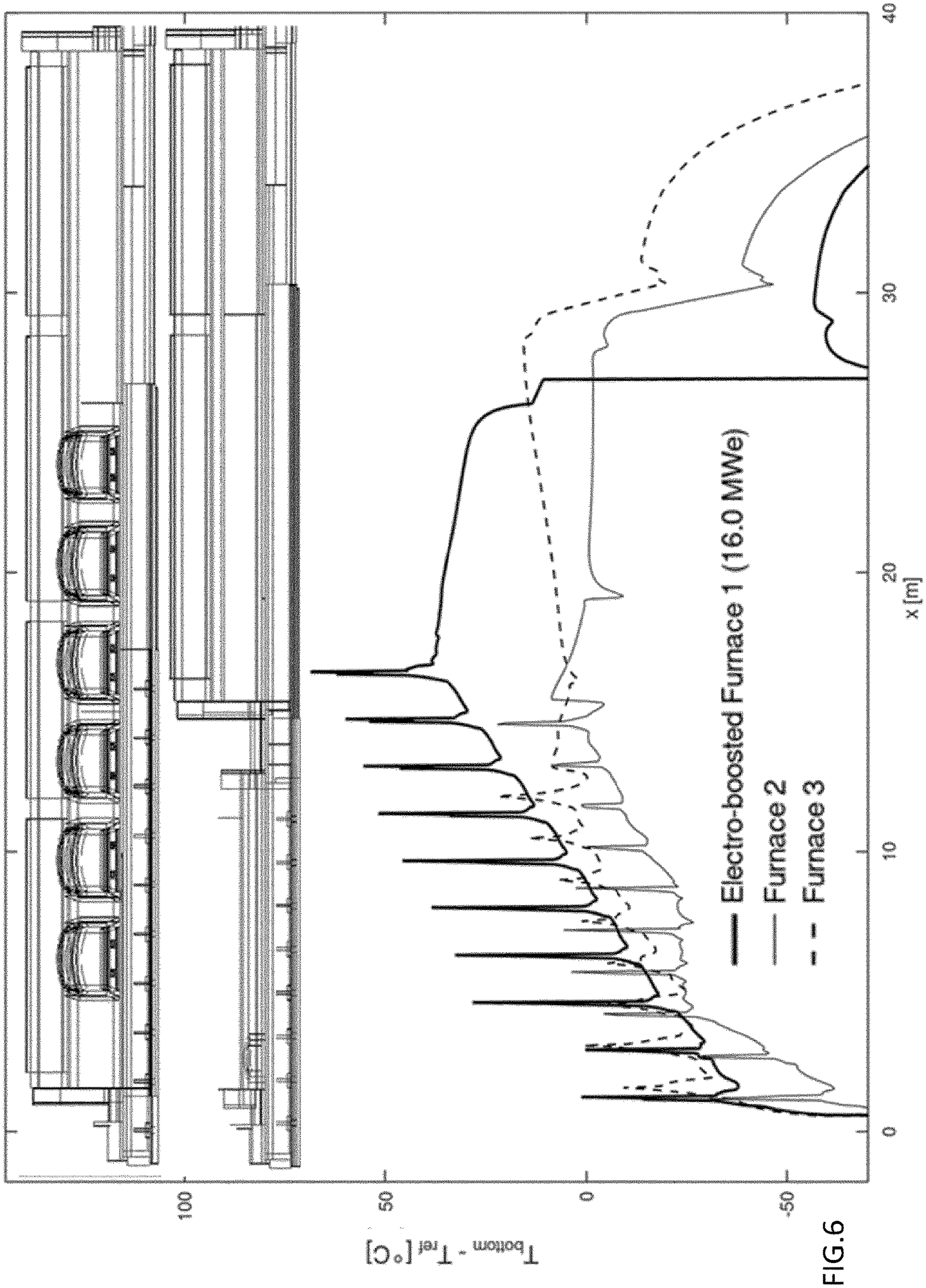
FIG. 6 shows the evolution of bottom refractory temperatures according to the distance (in meters) starting from the inlet mean to outlet mean.

FIG. 6 shows the evolution of bottom refractory temperatures according to the distance (in meters) starting from the inlet mean to outlet mean in furnace 1 with a non-realistic 16 MW electric power (by considering equivalent electric powers, fair comparison with furnaces of the invention may be achieved), furnace 2 and furnace 3. The y axis gives the value ($T_{bottom}$−$T_{ref}$) in degree celsius, $T_{bottom}$ being the temperature at the bottom of electro-boosted furnace 1, furnace 2 and furnace 3, and $T_{ref}$ being the maximum temperature at the bottom for furnace 1 without electro-boosting (full fuel conventional furnace). Furnaces 1-3 according to the invention are schematized at the top of the figure in order to locate the concerned zone in each configuration and to allow comparison.

This figure illustrates that there exists a significant bottom temperatures increase when increasing electrical power input in conventional furnace while the furnaces of the invention, for a same electrical input, allow to stay at lower value, which is advantageous for avoiding corrosion and thereby increasing furnace lifetime.

Crown Temperatures

Figure 7:
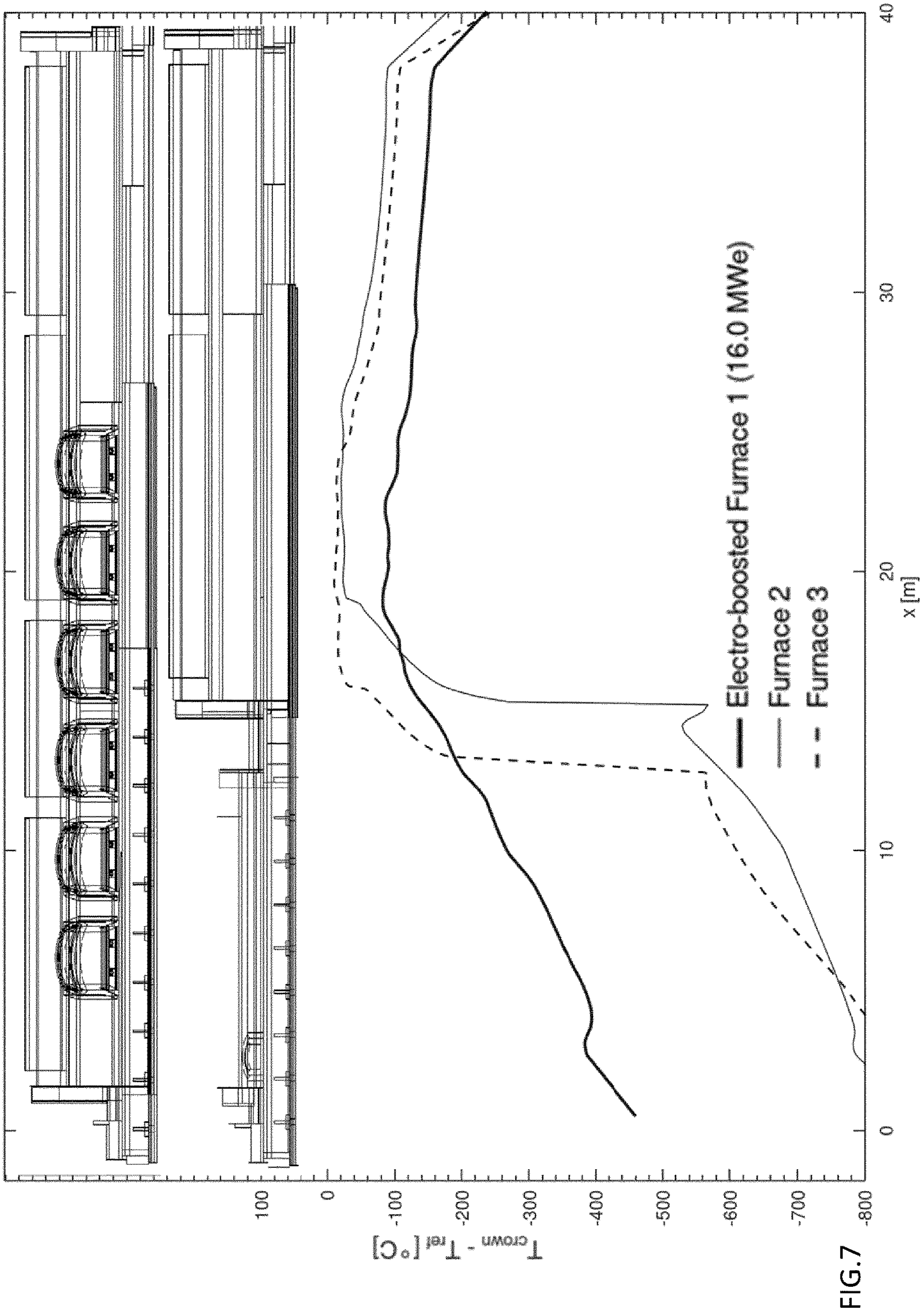
FIG. 7 shows the evolution of crown refractory temperatures according to the distance (in meters) starting from the inlet mean to outlet mean.

FIG. 7 shows the evolution of crown refractory temperatures according to the distance (in meters) starting from the inlet mean to outlet mean in furnace 1 with 16 MW electro-boosting (comparative), furnace 2 and furnace 3. The y axis gives the value ($T_{bottom}$−$T_{ref}$) in degree celsius, $T_{bottom}$ being the temperature at the crown of electro-boosted furnace 1, furnace 2 and furnace 3, and $T_{ref}$ being the maximum temperature at the crown of furnace 1 without electro-boosting (full fuel conventional furnace). Conventional electro-boosted furnace 1 and furnaces 2-3 according to the invention are schematized at the top of the figure in order to locate the concerned zone in each configuration and to allow comparison.

This figure illustrates that conventional furnace 1 and furnaces 2-3 according to the invention show crown temperatures decrease in the melting zone compared to conventional furnace without electro-boosting (ref). In the electro-boosted furnace, this is a huge drawbacks, as this leads to serious corrosion phenomenon at the crown (due to condensation of NaOH coming mainly from fining). In furnaces according to the invention, this crown temperature decrease is more easily manageable as (i) if flue gas is extracted from the fining tank, atmospheres from fining zone and melting zone are separated by at least one neck, thereby giving the possibility to limit or avoid reflux of corrosive fumes (NaOH) from the fining tank to the melting tank(s) and (ii)

if flue gas is extracted from the melting tank(s), as the crown span can be limited (in particular in the case of multiple melting tanks), it makes the use of alumina refractories a practicable option (knowing alumina is more resistant to corrosion but not recommended in the case of a large crown span).

Glass Circulation

Figure 8:
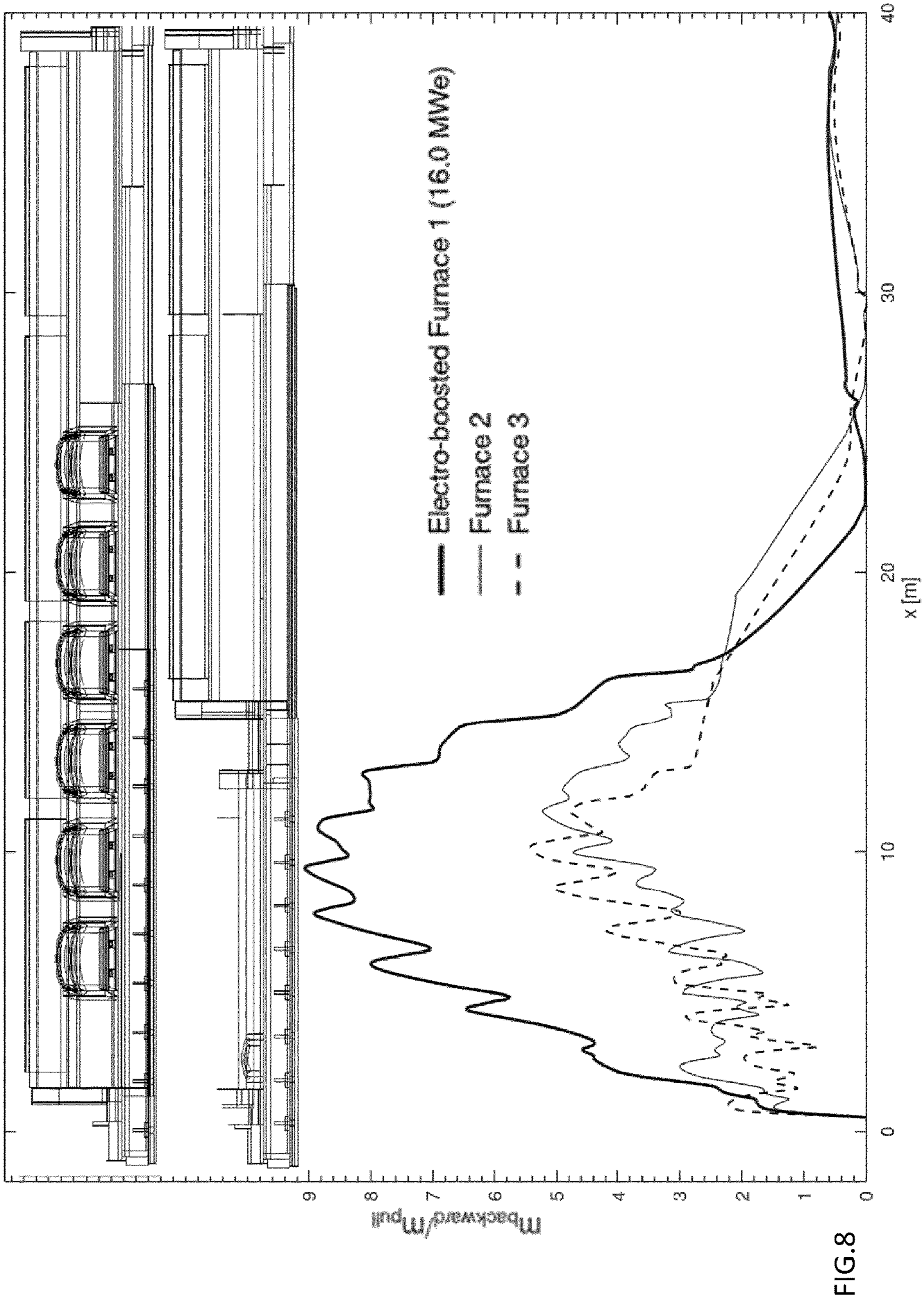
FIG. 8 shows the evolution of the molten glass circulation according to the distance (in meters) starting from the inlet mean to outlet mean.

FIG. 8 shows the evolution of the molten glass circulation according to the distance (in meters) starting from the inlet mean to outlet mean in furnace 1 with 16 MW electro-boosting (comparative), furnace 2 and furnace 3. The y axis gives the value ($m_{backward}/m_{pull}$), $m_{backward}$ being the backward mass flow and $m_{pull}$ being the pull mass flow. Conventional electro-boosted furnace 1 and furnaces 2-3 according to the invention are schematized at the top of the figure in order to locate the concerned zone in each configuration and to allow comparison.

This figure illustrates that the furnaces 2-3 according to the invention generate a significant decrease of the global molten glass circulation in the melting and fining zones that advantageously reduces the molten glass velocity, and thereby decreasing bottom refractory corrosion.

The invention claimed is:

1. A furnace for melting vitrifiable materials, comprising:

at least one first melting tank covered by a first melting crown and provided with electrical heating means;

a fining tank covered by a fining crown and provided with combustion heating means;

at least one first neck covered by a first neck crown and separating the at least one first melting tank and the fining tank;

at least one first inlet means located at the at least one first melting tank, for charging the at least one first melting tank with the vitrifiable materials to be heated; and at least one outlet means located downstream of the fining tank for a melted glass to flow to a working zone;

wherein the furnace is defined by the following:

$$0.1*W2 \leq W3i \leq 0.6*W2;$$

$$W1i \geq 1.4*W3i;$$

W1$i$ being a width of the at least one first melting tank;

W2 being a width of the fining tank; and

W3$i$ being a width of the at least one first neck.

2. The furnace according to claim 1, wherein the first melting crown has a height which is lower than a height of the fining crown.

3. The furnace according to claim 1, wherein the first neck crown has a height which is equal or lower than a height of the fining crown.

4. The furnace according to claim 1, wherein the first neck crown has a height which is equal or lower than a height of the first melting crown.

5. The furnace according to claim 1, wherein the furnace is defined by: W1$i$≥1.5*W3$i$.

6. The furnace according to claim 1, wherein the furnace is defined by 0.2*W2≤W3$i$≤0.6*W2.

7. The furnace according to claim 1, wherein the at least one first inlet means is located upstream of the at least one first melting tank or located at a top of the melting tank.

8. The furnace according to claim 7, wherein the at least one first inlet means is located upstream of the at least one first melting tank.

9. The furnace according to claim 1, wherein an opening of the at least one first neck is only partially under a surface of a glass melt.

10. A furnace for melting vitrifiable materials, comprising:

at least one first melting tank covered by a first melting crown and provided with electrical heating means;

a fining tank covered by a fining crown and provided with combustion heating means;

at least one first neck covered by a first neck crown and separating the at least one first melting tank and the fining tank;

at least one first inlet means located at the at least one first melting tank, for charging the at least one first melting tank with the vitrifiable materials to be heated;

at least one outlet means located downstream of the fining tank for a melted glass to flow to a working zone;

a second melting tank covered by a second melting crown and provided with electrical heating means located at a bottom of said second melting tank;

a second neck covered by a second neck crown and separating said second melting tank and the fining tank; and at least one second inlet means located at the second melting tank, for charging the second melting tank with the vitrifiable materials to be heated;

wherein the furnace is defined by the following:

$$0.1*W2 \leq W3i \leq 0.6*W2;$$

$$0.1*W2 \leq W3ii \leq 0.6*W2;$$

$$W1i \geq 1.4*W3i;$$

$$W1ii \geq 1.4*W3ii;$$

W1$i$ being a width of the at least one first melting tank;

W1$ii$ being a width of the second melting tank;

W2 being a width of the fining tank;

W3$i$ being a width of the at least one first neck; and

W3$ii$ being a width of the second neck.

11. The furnace according to claim 10, further comprising:

a third melting tank covered by a third melting crown provided with electrical heating means located at a bottom of said tank;

a third neck covered by a third neck crown and separating said third melting tank and the fining tank;

at least one third inlet means located at the third melting tank, for charging the third melting tank with the vitrifiable materials to be heated;

wherein the furnace is further defined by the following:

$$0.1*W2 \leq W3ii \leq 0.6*W2;$$

$$W1ii \geq 1.4*W3ii;$$

W1$iii$ being a width of the third melting tank; and

W3$iii$ being a width of the third neck.

12. The furnace according to claim 11, wherein the third melting crown has a height which is lower than a height of the fining crown.

13. The furnace according to claim 11, wherein the third crown has a height which is equal or lower than a height of the fining crown.

14. The furnace according to claim 11, wherein the third neck crown has a height which is equal or lower than a height of the third melting crown.

15. The furnace according to claim 11, wherein the furnace is defined by: W1*iii*≥1.5*W3*iii*.

16. The furnace according to claim 11, wherein the furnace is defined by 0.2*W2≤W3*iii*≤0.6*W2.

17. The furnace according to claim 10, wherein the second melting crown has a height which is lower than a height of the fining crown.

18. The furnace according to claim 10, wherein the second neck crown has a height which is equal or lower than a height of the fining crown.

19. The furnace according to claim 10, wherein the second neck crown has a height which is equal or lower than a height of the second melting crown.

20. The furnace according to claim 10, wherein the furnace is defined by: W1*ii*≥1.5*W3*ii*.

21. The furnace according to claim 10, wherein the furnace is defined by 0.2*W2≤W3*ii*≤0.6*W2.

22. The furnace according to claim 10, wherein the at least one second inlet means is located upstream of the at least one first melting tank.

23. The furnace according to claim 10, wherein the at least one third inlet means is located upstream of the at least one first melting tank.

* * * * *